(No Model.)

F. HUROP.
HORSESHOE ATTACHMENT.

No. 595,305.  Patented Dec. 14, 1897.

WITNESSES  
F. L. McKabie  
A. M. Poynton

INVENTOR  
Ferdinand Hurop;  
By John Hedderherne  
Attorney

United States Patent Office.

FERDINAND HUROP, OF DETROIT, MICHIGAN.

HORSESHOE ATTACHMENT.

SPECIFICATION forming part of Letters Patent No. 595,305, dated December 14, 1897.

Application filed January 20, 1897. Serial No. 619,859. (No model.)

*To all whom it may concern:*

Be it known that I, FERDINAND HUROP, a subject of the King of Denmark, residing at Detroit, in the county of Wayne and State of Michigan, have invented certain new and useful Improvements in Horseshoe Attachments; and I do hereby declare the following to be a full, clear, and exact description of the invention, such as will enable others skilled in the art to which it appertains to make and use the same.

This invention has reference to a novel attachment for horseshoes; and it consists in the features of construction hereinafter fully described and claimed.

Figure 1:
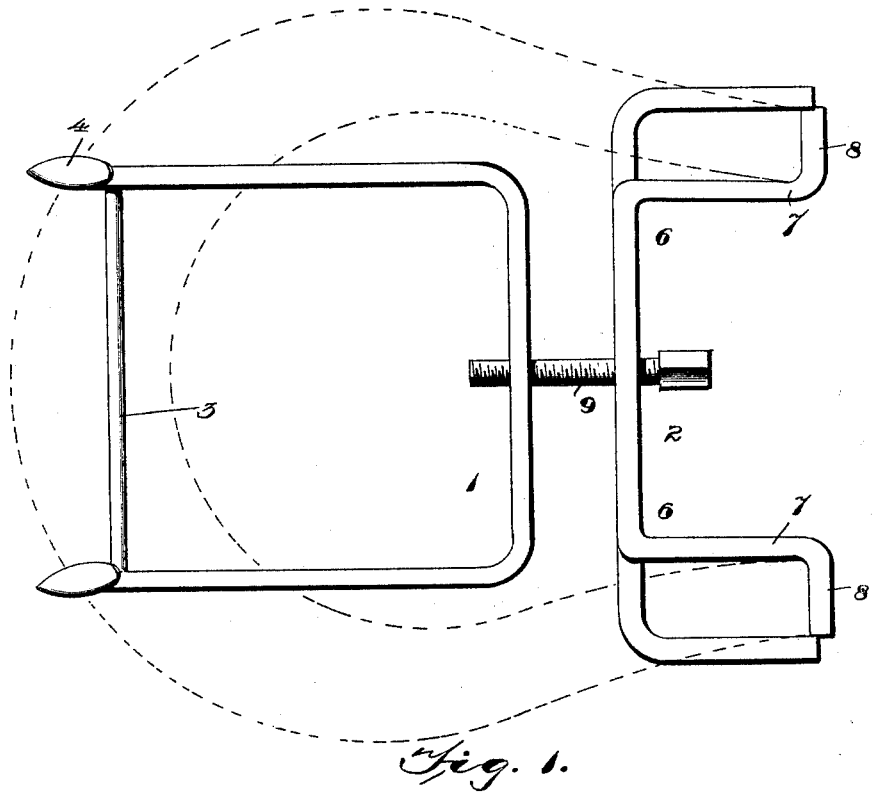
Figure 2:
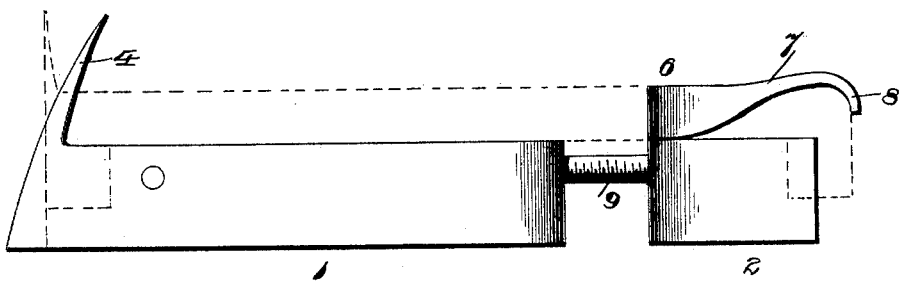

In the accompanying drawings, forming a part of this specification, Figure 1 is a top plan of this attachment, showing the horseshoe in dotted lines. Fig. 2 is a side elevation also showing said horseshoe in dotted lines.

This attachment is adapted for attachment to horseshoes to prevent the horse from slipping on ice or sleet, and consists of two blades or calks 1 and 2. The blade or toe-calk consists of a bent piece whose lower edge is sharpened and whose upper edge is adapted to abut against the lower face of the horseshoe. The end portions of this blade or toe-calk extend in the direction of the length of the horseshoe, while the rear end portion thereof is situated transversely. The forward end portions of the curved blade are connected together by a brace-rod 3, and said blade is provided with upwardly-extending projections 4 to engage the front edge of the horseshoe. The rear blade or heel-calk 2 consists of a transverse blade having rearwardly-turned ends adapted to lie against the end face of the horseshoe and on the outside of the heels thereof. The said transverse blade is also provided with upwardly-extending shoulders 6 to fit between the rear end portions of the horseshoe, while extending rearwardly from said shoulders are arms 7, having outwardly-extending lugs 8 to engage the heel of the shoe. A screw-bolt 9 passes through openings in the transverse portion of the two blades, the blade 2 having the opening enlarged to allow the bolt to pass loosely therethrough, while the front opening is screw-threaded, and this bolt is provided with a squared end to receive a key, by means of which it can be turned to draw the blades or calks toward each other or to allow them to separate.

The manner in which said device is attached to the horseshoe is shown in the drawings, and it is obvious that by tightening up the bolt the lugs upon the rear end of the arms 7 engage the heel of the shoe, while the forward projections 4 engage the forward edge of the shoe to hold the attachment in place. By loosening the bolt the attachment can be readily removed.

These attachments can be made in different sizes to fit different sizes of horseshoes and can be readily attached and removed from the shoe while the latter is on the horse's foot.

Having thus described my invention, what I claim as new, and desire to secure by Letters Patent, is—

1. A horseshoe attachment consisting of a front and rear member, the front member comprising two longitudinal blades connected at their rear ends by a transverse blade and at their front ends by a brace-rod, upwardly-extending projections at the front ends of said longitudinal blades, the said rear member consisting of a transverse blade having rearwardly-extending blades provided with arms having lugs, and a tightening device connecting the transverse blades of said members, substantially as described.

2. An attachment for horseshoes consisting of a front and a rear member, the front member comprising two longitudinal blades connected at their rear ends by a transverse blade and at their front ends by a brace-rod, upwardly-extending projections at the front ends of said longitudinal blades, the rear member consisting of a transverse blade having rearwardly-extending longitudinal blades, said transverse blade being provided with forwardly-extending shoulders 6 to fit between the rear end portions of the horseshoe, arms 7 extending rearwardly from said shoulders and provided with outwardly-extending lugs to engage the heels of a horseshoe, and a tightening device extending between the transverse blades of said members, substantially as described.

In testimony whereof I have signed this specification in the presence of two subscribing witnesses.

FERDINAND HUROP.

Witnesses:
CHARLES SCHWARTZ,
CHARLES E. LOVE.